(12) United States Patent
Rippel et al.

(10) Patent No.: US 9,018,809 B2
(45) Date of Patent: Apr. 28, 2015

(54) INTEGRATED MOTOR DRIVE AND BATTERY CHARGING SYSTEM

(75) Inventors: Wally Ewald Rippel, Altadena, CA (US); Scott Garret Berman, Los Angeles, CA (US)

(73) Assignee: AeroVironment, Inc., Monrovia, CA (US)

(*) Notice: Subject to any disclaimer, the term of this patent is extended or adjusted under 35 U.S.C. 154(b) by 0 days.

(21) Appl. No.: 13/474,415

(22) Filed: May 17, 2012
(Under 37 CFR 1.47)

(65) Prior Publication Data
US 2013/0069492 A1 Mar. 21, 2013

Related U.S. Application Data

(63) Continuation of application No. PCT/US2010/057057, filed on Nov. 17, 2010.

(60) Provisional application No. 61/262,117, filed on Nov. 17, 2009.

(51) Int. Cl.
| | | |
|---|---|---|
| H02K 11/00 | (2006.01) | |
| H02J 7/04 | (2006.01) | |
| B60L 11/18 | (2006.01) | |

(52) U.S. Cl.
CPC ............ *H02J 7/045* (2013.01); *B60L 11/1816* (2013.01); *B60L 2220/54* (2013.01); *Y02T 10/7088* (2013.01); *Y02T 10/7005* (2013.01); *Y02T 10/641* (2013.01); *Y02T 90/121* (2013.01); *Y02T 90/14* (2013.01)

(58) Field of Classification Search
USPC .......................... 310/68 D, 68 R, 71; 318/803
See application file for complete search history.

(56) References Cited

U.S. PATENT DOCUMENTS

| | | | | |
|---|---|---|---|---|
| 2,010,869 A | * | 8/1935 | Lilja | 318/750 |
| 2,320,875 A | * | 6/1943 | Liwschitz | 318/712 |
| 4,228,373 A | * | 10/1980 | Funderburg | 310/20 |
| 4,920,475 A | | 4/1990 | Rippel | |

(Continued)

FOREIGN PATENT DOCUMENTS

| | | |
|---|---|---|
| CN | 1158797 A | 9/1997 |
| CN | 101472759 A | 7/2009 |
| CN | 101479927 A | 7/2009 |

OTHER PUBLICATIONS

International Searching Authority (ISA/US); International Search Report (ISR) for parent PCT case application No. PCT/US2010/057057 entitled Integrated Motor Drive and Battery Charging System by Rippel et al.; mailed Jan. 28, 2011 from US International Searching Authority; 2 pgs.

(Continued)

*Primary Examiner* — Thanh Lam
(74) *Attorney, Agent, or Firm* — Christopher R. Balzan; Eric J. Aagaard

(57) ABSTRACT

In one possible embodiment, a motor charging system for connection with a battery is provided having a rotor and a stator. The stator has delta H-bridge connected windings. The delta H-bridge includes an inverter at one side and a switching means at another side with each winding being connected between inverter pole switches and switching means pole switches. An A/C power port is connected to the windings such that when the switching means is off the A/C power port is connected to the battery bus via the windings and the inverter.

14 Claims, 5 Drawing Sheets

(56) References Cited

U.S. PATENT DOCUMENTS

| | | | | |
|---|---|---|---|---|
| 4,937,725 | A | * | 6/1990 | Dhyanchand et al. ...... 363/56.05 |
| 5,099,186 | A | * | 3/1992 | Rippel et al. ................... 318/803 |
| 5,341,075 | A | | 8/1994 | Cocconi |
| 5,515,264 | A | * | 5/1996 | Stacey ........................... 363/132 |
| 5,821,652 | A | * | 10/1998 | Hyypio ............................ 310/83 |
| 5,901,801 | A | * | 5/1999 | Toida et al. ................... 180/65.1 |
| 5,914,590 | A | | 6/1999 | Wacknov et al. |
| 6,232,742 | B1 | | 5/2001 | Wacknov et al. |
| 6,888,062 | B1 | * | 5/2005 | Erickson et al. .............. 174/359 |
| 2004/0071003 | A1 | | 4/2004 | Cocconi |
| 2006/0082341 | A1 | | 4/2006 | Cocconi |
| 2007/0201995 | A1 | * | 8/2007 | Harstad et al. ........... 417/423.12 |
| 2009/0146612 | A1 | * | 6/2009 | Oyobe et al. .................. 320/138 |
| 2009/0184681 | A1 | | 7/2009 | Kuno |

OTHER PUBLICATIONS

International Searching Authority (ISA/US); Written Opinion of the International Searching Authority (WO) for parent PCT/US2010/057057 entitled Integrated Motor Drive and Battery Charging System by Rippel et al.; mailed Jan. 28, 2011 from US International Searching Authority; 6 pgs.

International Searching Authority (ISA/US); Examiner's Search History for parent PCT case application No. PCT/US2010/057057 entitled Integrated Motor Drive and Battery Charging System by Rippel et al.; mailed Jan. 28, 2011 from US International Searching Authority; 17 pgs.

The State Intellectual Property Office of the People's Republic of China (SIPO) Office Action (OA) for corresponding Chinese Patent Application No. 2010-80053715.3 Entitled Integrated motor drive and battery charging system, by Rippel et al., Issued Jun. 5, 2014 from Japan Patent Office; 6 pgs.

The State Intellectual Property Office of the People's Republic of China (SIPO) Search Report (SR) for corresponding Chinese Patent Application No. 2010-80053715.3 Entitled Integrated motor drive and battery charging system, by Rippel et al., Issued May 26, 2014 from Japan Patent Office; 2 pgs.

* cited by examiner

INTEGRATED MOTOR DRIVE AND BATTERY CHARGING SYSTEM

CROSS REFERENCE TO RELATED APPLICATIONS

The present application is a continuation of PCT Application number PCT/US2010/057057, by Rippel et al., entitled INTEGRATED MOTOR DRIVE AND BATTERY CHARGING SYSTEM, filed Nov. 17, 2010, herein incorporated by reference in its entirety, which claims priority of U.S. Provisional Application No. 61/262,117, by Rippel et al., filed Nov. 17, 2009, herein incorporated by reference in its entirety.

BACKGROUND

Electric motors and charging systems for vehicles need to be light weight, compact, and convenient. Induction motors are often used in vehicles. A separate inverter charging system is used to charge the battery from a utility power line, such as a 220VAC wall socket.

FIG. 1 shows a simplified schematic of a prior art induction motor and battery charging system 100. The stator 120 has three windings 120a, 120b, and 120c connected in a Y connection to a neutral node 125. An inverter 150 is connected between the battery 105 and the windings 120a, 120b, and 120c. The inverter 150 typically is controlled by a controller (not shown in FIG. 1) to convert the DC power from the battery 105 to AC power for the windings 120a, 120b, and 120c, to impart a torque on the rotor 140.

In this system 100, the battery 105 is charged by a separate AC to DC charger 110, which is connected to utility power 115. The charger 110 is connected across the battery 105.

With such a system, the charger 110 adds additional weight to the vehicle if integrated or separately carried on board the vehicle. If separate from the vehicle, the charger 110 might not be present, in the event it is needed for convenience or opportunity charging, or in case of an emergency.

What is needed is a charging system for electric vehicles that is light weight and convenient.

SUMMARY

In one possible embodiment, a motor charging system for connection with a battery is provided having a rotor and a stator. The stator has Y-connected windings connected together connected at a neutral node. An inverter is connected between a battery bus and the stator windings. Switches are connected in the windings so as to be capable of disconnecting two of the windings from the neutral node and connecting the two windings to a single phase A/C power connector.

In an alternate embodiment, a motor charging system for connection with a battery is provided having a rotor and a stator. The stator has delta H-bridge connected windings. The delta H-bridge includes an inverter at one side and a switching means at another side with each winding being connected between inverter pole switches and switching means pole switches. An A/C power port is connected to the windings such that when the switching means is off the A/C power port is connected to the battery bus via the windings and the inverter.

Various embodiments may include interphase transformers.

BRIEF DESCRIPTION OF THE DRAWINGS

The features and advantages of the present invention will be better understood with regard to the following description, appended claims, and accompanying drawings where:

DESCRIPTION

In various embodiments, a battery/motor drive with integrated recharge is provided. The motor may be any three-phase machine including induction and DC brushless. The recharge source may be single phase, three phase, or DC, with any voltage level, preferably a voltage level such that the peak voltage is less than the battery voltage $V_{bat}$. In various embodiments, any power factor can be provided, including 1 and −1 (unity power factor for reverse power flow). Some advantages of various embodiments include, reduced DC bus ripple current, reduced phase ripple current, elimination of phase contactor, and elimination of the winding neutral splice within the machine.

Figure 1:
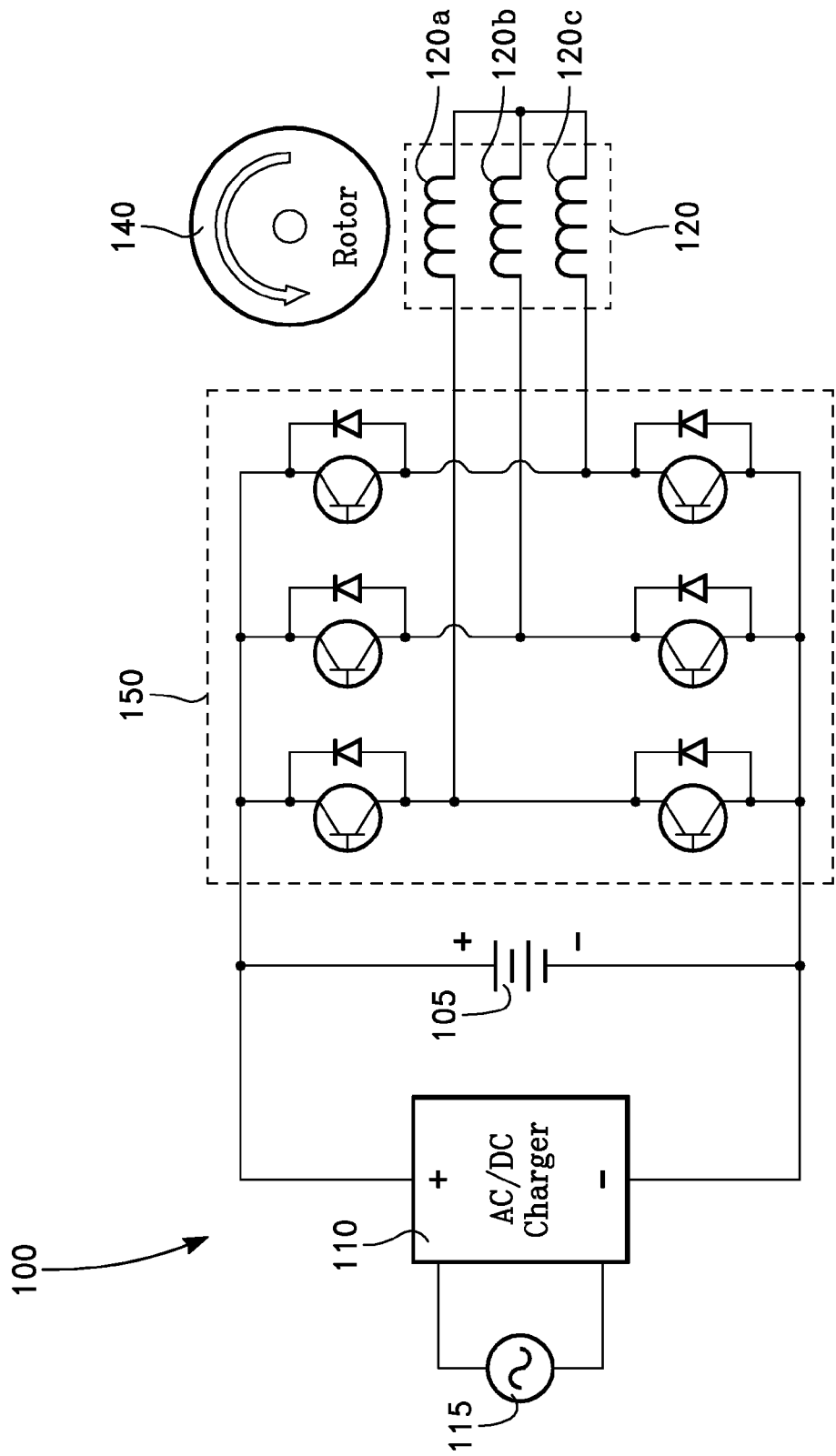
FIG. 1 shows a simplified schematic of a prior art induction motor and battery charging system.
Figure 2:
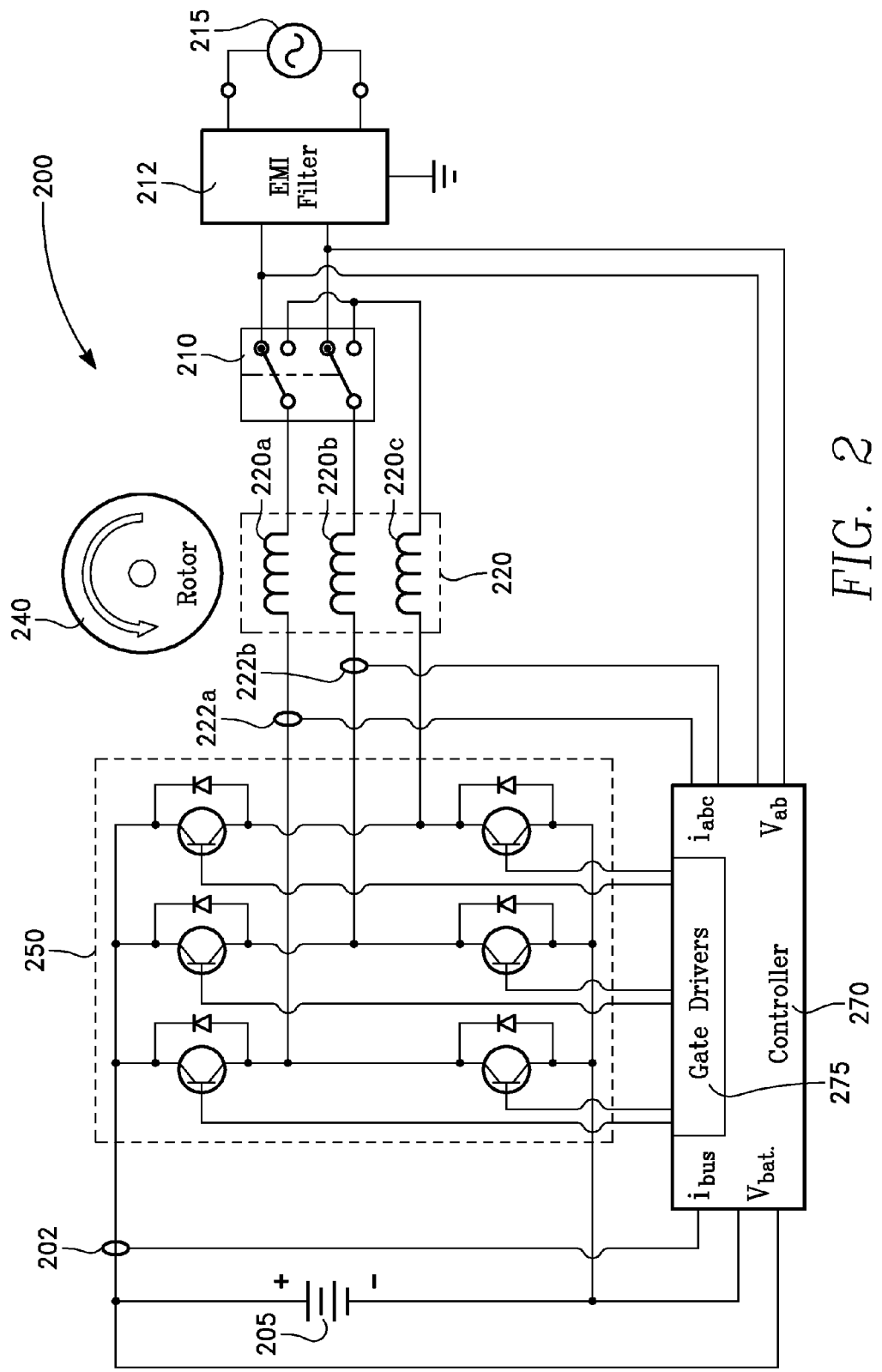
FIG. 2 shows a simplified schematic of an induction motor and battery charging system for a single phase Y-connected stator winding.

Open Y Configuration (FIG. 2)

FIG. 2 shows a simplified schematic of an induction motor and battery charging system 200 for a single phase Y-connected stator winding 220. In this embodiment, the battery 205 is charged by single phase utility power 215 through the winding 220. A double pole switch 210 is placed in the Y-connected winding 220 circuit to disconnect the windings 220a and 220b from a neutral and connect them to the utility power 215 via an optional EMI filter 212. In the open Y configuration, the windings 220a and 220b are used as inductors in the charging circuit. The inverter 250 is controlled by controller 270 to convert the AC utility power 215 passed through the windings 220a and 220b.

In FIG. 2, the inverter 250 is comprised of diode connected Insulate Gate Bipolar Transistors or IGBTs which are controlled by gate drivers 275 in the controller 270. Other inverter circuits are possible. Current sensors 222a and 222b may be connected to the windings 220 to sense the currents $i_a$, and $i_b$ in the windings 220a and 220b during charging, and to determine the currents $i_a$, $i_b$, and $i_s$ in the windings 220a, 220b, and 220c during motor operation. Current sensor 202 senses the battery bus current $i_{bus}$. The controller 270 also has sensor inputs to sense the voltage $V_{bat}$ across the battery 205 and the voltage $V_{ab}$ of the utility power 215.

In various embodiments, the controller 270 monitors the utility voltage and controls current in the windings 220 so as to track the AC voltage so as to end up with unity power factor. Another function of the controller 270 is to monitor current to the battery 205 and battery 205 voltage to regulate the current going into battery 205 and/or at some point switch to regulate voltage into battery 205 and reduce current into battery 205.

During charging, the rotor 240 may be locked or otherwise secured. During motor operation, the switch 210 is switched so that the windings 220a, 220b, and 220c are Y-connected, disconnecting the utility power 215 from the winding 220.

The utility power 215, and optionally in some embodiments the EMI filter 212, may be physically disconnected from the circuit 200.

Figure 3:
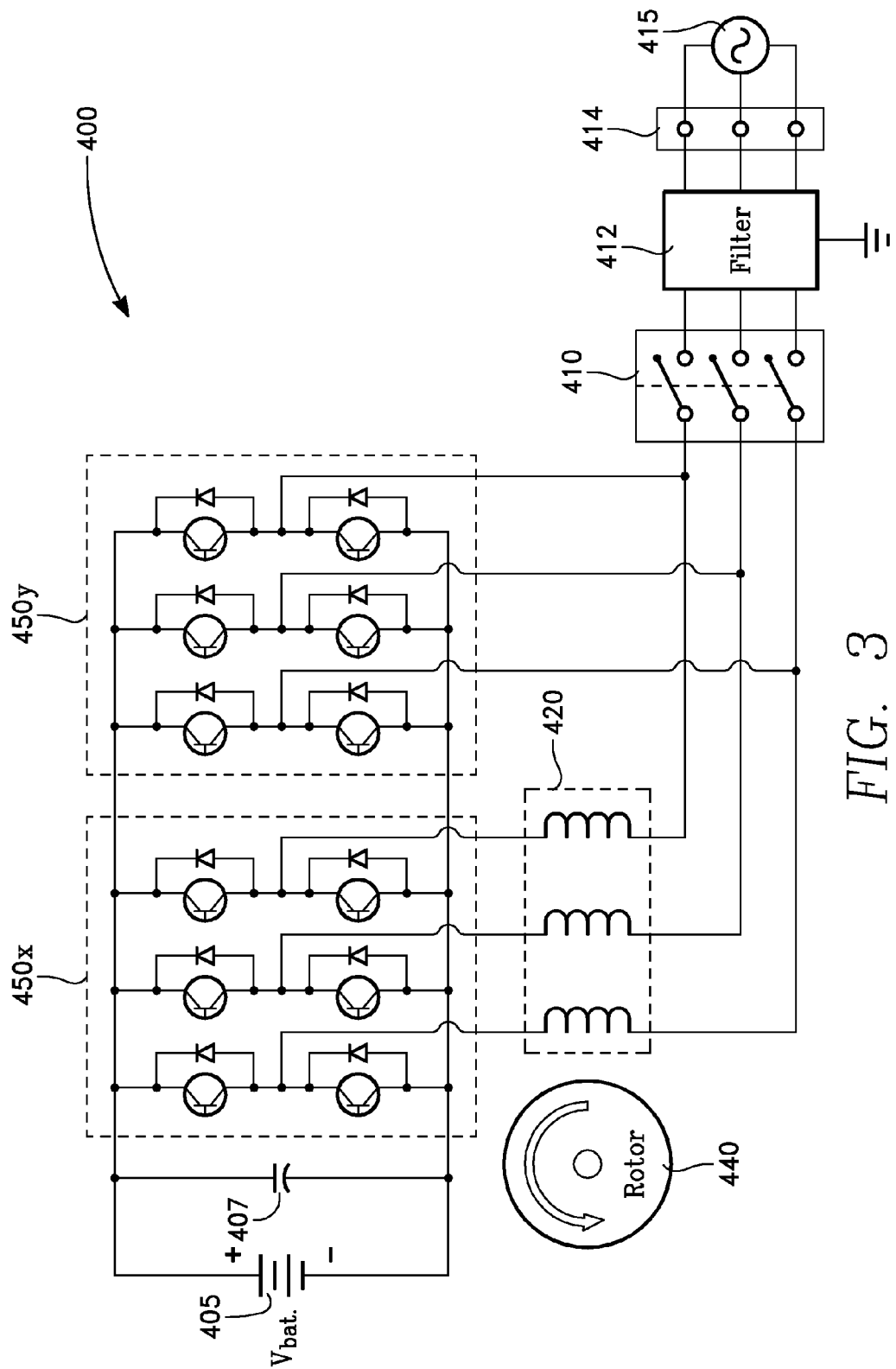
FIG. 3 shows a simplified schematic of an induction motor and battery charging system for a three phase delta H-bridge configured winding.
Figure 4:
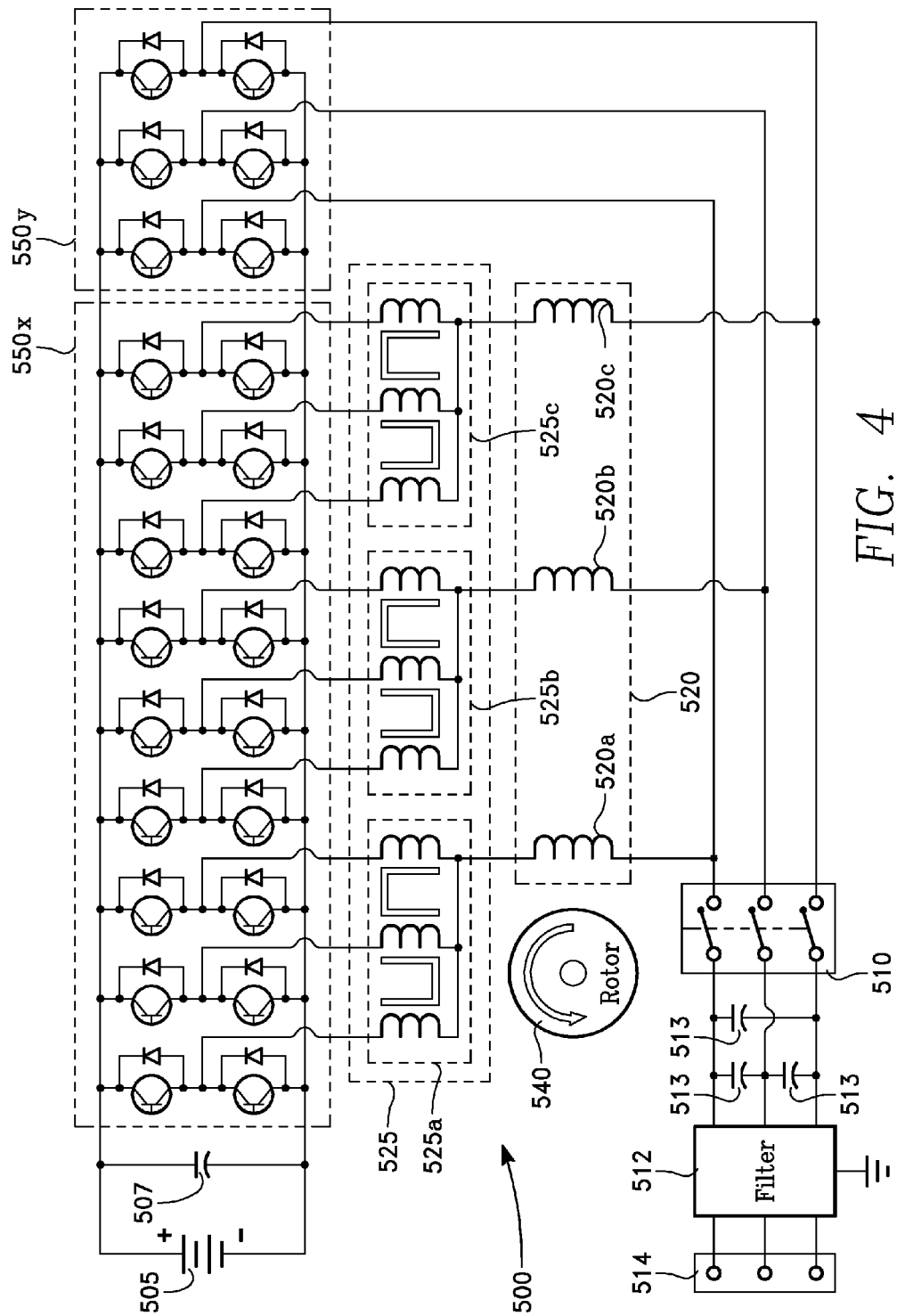
FIG. 4 shows a simplified schematic of an induction motor and battery charging system for a three phase delta H-bridge configured winding with interphase transformers.
Figure 5:
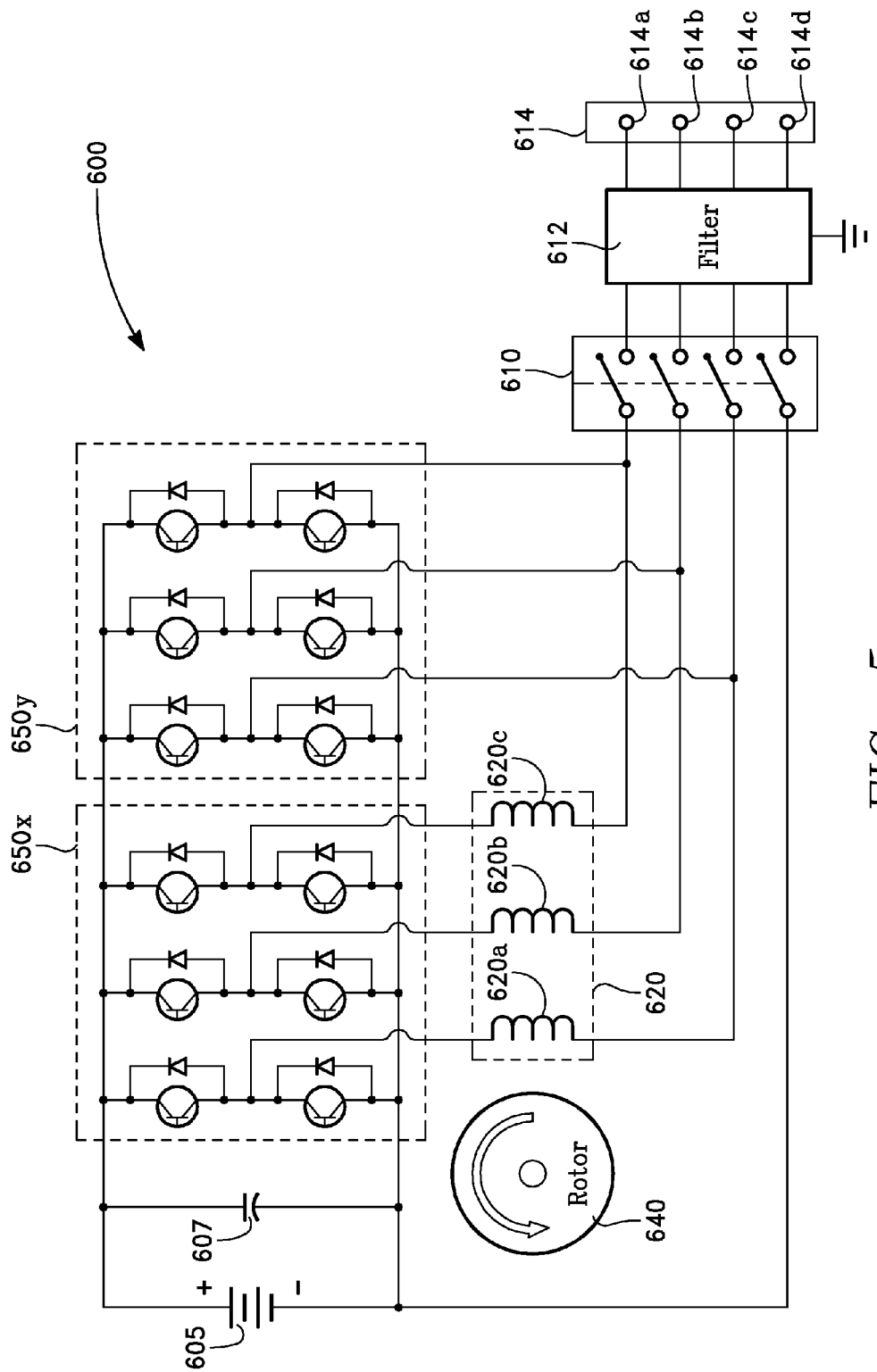
FIG. 5 shows a simplified schematic of an induction motor and battery charging system for a three phase delta H-bridge configured winding.

Open Delta H-Bridge Configuration (FIGS. 3-5)

FIG. 3 shows a simplified schematic of an induction motor and battery charging system 400 for a three phase delta H-bridge configured winding 450. In this embodiment, the battery 405 is charged by three phase utility power 415 through the winding 420.

In the motoring mode, the switches 450x and 450y are operated symmetrically. In the recharge mode, the switches 450y are held off.

It is understood that in various embodiments, the utility power 415, and in some embodiments (not shown) the recharge filter 412, may be plugged/unplugged from the circuit 400 for charging/motoring. Thus, it is likely wise to place recharge switches 410 in series with the recharge port 414. This provides added safety. The optional recharge switches 410 may be utilized to connect the utility power 415 via the optional recharge filter 412 during recharge (or when generating DC power at the port 414).

An advantage of some embodiments of the open delta H-bridge configuration is the phase ripple fundamental frequency is 2f and peak amplitude at ripple/peak modulation voltage is equal to 1. This compares with 1.15 for conventional. Thus, high frequency AC losses in some winding embodiments are reduced by 30%. Fundamental ripple on bus capacitor 407 is increased from 2f to 4f and ripple magnitude is reduced by a factor of 2*sqrt3.

In some embodiments, the switches 450x may be replaced each with sub phases and interphase transformers to provide further ripple attenuation. This may be desired in some embodiments, so that the recharge filter 412 can be down sized.

FIG. 4 shows a simplified schematic of an induction motor and battery charging system 500 for a three phase delta H-bridge configured winding 520 with interphase transformers or averaging transformers. With this embodiment, the switches 550y are operated in six-step for motoring (tri-state off for recharge mode). The switches 550x are operated in pulse width modulation for both motoring and recharge. For each subphase, duty cycles are the same length, but shifted +/−T/3 relative to the nearest neighbor subphase. In motoring mode, the harmonic currents on the motor windings 520 are reduced 9 times and the frequency is increased 3 times as compared to the circuit 400 (FIG. 3). The ripple currents and losses in the DC voltage bus are very low due to harmonic cancellation. Motor losses are minimized because voltages and currents are near sinusoidal. Further, the $CV^2f$ losses are reduced to nil, due to reduced common-mode components.

In recharge mode, harmonic cancellation by the interphase transformers 525a-c is such that the lowest harmonics are at 6f with a voltage reduction of 3 times as compared to the circuit 400 of FIG. 3. Also, capacitance filters 513 is reduced 27 times for a given voltage ripple as compared to the circuit 400 of FIG. 3.

Furthermore, phase-to-phase capacitors 513 on the order of 10 microFarads and 100 microFarads across the utility power lines may be added to provided improved harmonic cancellation. Thus, various embodiments have a great advantage in that they have relatively low ripple and a relatively small filter capacitance. This is especially true where the motor is large and the stator inductance $L_s$ is small.

Typically, in the various embodiments, a port 514 is provided for connection to utility power (not shown in FIG. 5).

Further in some embodiments, the port 514 could be used to provide AC power to an external device (not shown).

Although in the circuit shown in FIG. 4, 550y is switched in six step while 550x is PWM controlled sinusoidally to produce sinusoidal phase currents, other embodiments are possible. For example, in other embodiments 550y may "mirror" 550x in operation, switched at the fundamental frequency of the voltage imposed on each winding rather than at the switching frequency.

With various embodiments in accordance with the open delta h-bridge configuration, the recharge power rating may be reduced by 1/sqrt3 relative to a three phase Y-connected circuit. On the other hand, a benefit is that at the reduced power, where most of the recharge energy will flow, the magnetic losses are greatly reduced. With ΔB reduced by 1/(2*sqrt3) and f increased 2 times, the magnetic losses will be reduced by more than 3 times.

In various embodiments, charging through the windings may present problems which can include capacitance between winding and case of motor. Common mode currents can be generated in that coupling. One solution is to isolate the motor from the vehicle to prevent currents on the frame of the vehicle, which could cause shock hazard. This may also include a non-conducting mounting and a non-conducting motor shaft, or coupling thereto. In one possible embodiment to reduce capacitive charge build up is to utilize a non-conductive motor casing.

In some embodiments, during charging, it is preferable to lock the rotor to keep the vehicle from inadvertently moving. As there is not always a clutch in electric vehicles, a rotor locking mechanism (not shown) may be used to lock the rotor. In other embodiments, the rotor could be withdrawn from the stator, or in other embodiments, open connections of squirrel cage, for example opening circuiting the shorting rings. In yet another embodiment, a shield may be inserted to block the coupling from the windings to the rotor, for example a conductor sleeve inserted between the rotor and stator when charging.

With charging through the winding of a single phase motor there is not generally a net torque on rotor, but rather it will oscillate back and forth. This is not true for three phase motors, as charging current through winding will create a unidirectional torque on the rotor.

FIG. 5 shows a simplified schematic of an induction motor and battery charging system 600 for a three phase delta H-bridge configured winding 650. In various embodiments, in addition to the AC power at ports 614a-c, DC power may also be provided at port 614 at DC port 614d. The DC power may be used to boost the recharge power. Although not shown in FIG. 5, interphase transformers 525 (FIG. 4) may be included in this embodiment.

Although not every feature is shown in every embodiment, features from various embodiments may be utilized in other embodiments, for example controllers, capacitor filters, drivers, sensors, etc. Additionally, not every feature shown is necessary in every embodiment, whether explicitly identified as optional or not.

It is worthy to note that any reference to "one embodiment" or "an embodiment" means that a particular feature, structure, or characteristic described in connection with the embodiment may be included in an embodiment, if desired. The appearances of the phrase "in one embodiment" in various places in the specification are not necessarily all referring to the same embodiment.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

Having described this invention in connection with a number of embodiments, modification will now certainly suggest itself to those skilled in the art. The example embodiments herein are not intended to be limiting, various configurations and combinations of features are possible. As such, the invention is not limited to the disclosed embodiments, except as required by the appended claims.

What is claimed is:

1. An integrated power conversion system for a vehicle, the integrated motor power conversion system comprising:
   a) a rotor;
   b) a stator comprising windings connected together connected at a neutral node;
   c) an inverter connected between a battery bus and the windings;
   d) single phase A/C power connector; and
   e) switches connected in the windings so as to be capable of disconnecting two of the windings from the neutral node and connecting the two windings to the single phase A/C power connector.

2. The system of claim 1, further comprising a means to inhibit rotor movement during recharge.

3. The system of claim 2, wherein the means to inhibit rotor movement comprises a rotor blocking mechanism.

4. The system of claim 2, wherein the means to inhibit rotor movement comprises a means to withdraw the rotor from within the stator.

5. The system of claim 2, wherein the means to inhibit rotor movement comprises a means to open circuit the rotor.

6. The system of claim 5, wherein the rotor is a squirrel cage rotor comprising shorting rings, and wherein the means to inhibit rotor movement comprises a means to open circuit the shorting rings.

7. The system of claim 2, wherein the means to inhibit rotor movement comprises a means to inhibit coupling between the stator and the rotor.

8. The system of claim 7, wherein the means to inhibit coupling between the stator and the rotor comprises a shield between the stator and the rotor.

9. The system of claim 7, wherein the means to inhibit coupling between the stator and the rotor comprises a conductive sleeve.

10. An integrated power conversion system for a vehicle, the integrated power conversion system comprising:
    a) a rotor;
    b) a stator comprising windings connected together connected at a neutral node;
    c) an inverter between a battery bus and the stator;
    d) an A/C power connector;
    e) switches connected in the windings so as to be capable of disconnecting the windings from the neutral node and connecting the windings to the A/C power connector for battery charging through the winding; and
    f) a motor casing means for inhibiting capacitive charging of the vehicle by the motor during battery charging.

11. The system of claim 10, wherein the motor casing means for inhibiting capacitive charging of the vehicle comprises a motor casing comprising a non-conducting material.

12. The system of claim 10, wherein the motor casing means for inhibiting capacitive charging of the vehicle comprises a non-conductive motor mounts.

13. The system of claim 10 further comprising a non-conductive rotor shaft.

14. The system of claim 10 further comprising a non-conductive rotor shaft coupling.

* * * * *